(12) United States Patent
Vanderheyden et al.

(10) Patent No.: US 7,861,961 B2
(45) Date of Patent: Jan. 4, 2011

(54) METHOD AND APPARATUS FOR UTILIZING A TAPE LEADER IN A TAPE DRIVE SYSTEM

(75) Inventors: William J. Vanderheyden, Loveland, CO (US); Fred Winslow Livermore, Stillwater, MN (US)

(73) Assignee: Oracle America, Inc., Redwood City, CA (US)

( * ) Notice: Subject to any disclaimer, the term of this patent is extended or adjusted under 35 U.S.C. 154(b) by 1190 days.

(21) Appl. No.: 11/317,745

(22) Filed: Dec. 23, 2005

(65) Prior Publication Data

US 2007/0145172 A1  Jun. 28, 2007

(51) Int. Cl.
G11B 15/66 (2006.01)
(52) U.S. Cl. .............. 242/332.4; 242/348; 360/132
(58) Field of Classification Search ......... 242/332.4, 242/532.1, 532.7, 582; G9B/15.902, 23.086; 360/90, 91, 92.1, 93, 95
See application file for complete search history.

(56) References Cited

U.S. PATENT DOCUMENTS

| | | | |
|---|---|---|---|
| 3,650,378 A | 3/1972 | Kakiuchi et al. | |
| 3,857,531 A | 12/1974 | Jantzen | |
| 3,934,840 A * | 1/1976 | Inaga | 242/332.4 |
| 4,775,115 A | 10/1988 | Gelardi | |
| 5,053,902 A | 10/1991 | Kato | |
| 5,209,425 A | 5/1993 | Krabbenhoft et al. | |
| 5,262,918 A | 11/1993 | Tannert | |
| 5,280,403 A | 1/1994 | Martin | |
| 5,465,187 A | 11/1995 | Hoge et al. | |
| 5,845,860 A * | 12/1998 | Tohjo et al. | 242/348 |
| 5,969,913 A | 10/1999 | Vanderheyden et al. | |
| 6,057,980 A | 5/2000 | Todd et al. | |
| 6,069,777 A | 5/2000 | Vanderheyden et al. | |
| 6,568,617 B1 * | 5/2003 | Rambosek | 242/332.4 |
| 6,915,975 B2 * | 7/2005 | Vanderheyden | 242/332.4 |
| 7,086,623 B2 * | 8/2006 | Sato et al. | 242/348.2 |
| 7,334,750 B2 * | 2/2008 | Vanderheyden et al. | 242/332.4 |
| 7,398,940 B2 * | 7/2008 | Hiraguchi et al. | 242/332.4 |
| 2007/0145173 A1 * | 6/2007 | Livermore et al. | 242/348 |

* cited by examiner

*Primary Examiner*—Michael R Mansen
*Assistant Examiner*—Juan J Campos
(74) *Attorney, Agent, or Firm*—Brooks Kushman P.C.

(57) ABSTRACT

A system for utilizing a tape leader in a tape drive system. The tape drive system receives a first tape leader and buckles the first tape leader to a drive reel leader. Then the tape drive system threads the first tape leader and a second tape leader connected to the first tape leader through a tape path within the tape drive system using the drive reel leader. After threading the first tape leader through the tape path, the tape drive system retracts head protect pins while the second tape leader is still in the tape path. Subsequent to retracting the head protect pins, the tape drive system performs read/write operations on a data storage media, which is coupled to the first tape leader via the second tape leader inserted between the first tape leader and the data storage media.

16 Claims, 4 Drawing Sheets

METHOD AND APPARATUS FOR UTILIZING A TAPE LEADER IN A TAPE DRIVE SYSTEM

BACKGROUND OF THE INVENTION

1. Field of the Invention

The present invention relates generally to an improved tape drive system and in particular to a method and an apparatus for handling data storage media in the tape drive system. Still more particularly, the present invention provides a method and an apparatus for handling the data storage media, in the form of magnetic tape, by utilizing an intermediate tape leader.

2. Description of the Related Art

Magnetic recording tape is commonly used to store digital data because magnetic recording tape is inexpensive and provides significant data storage capacity per unit volume. Consequently, magnetic recording tape remains an active component in many business operations, especially where large amounts of data must be backed-up for archival purposes. Magnetic recording tape may be housed in a tape cartridge or cassette, which protects the magnetic recording tape from damage.

Data may be read from, or written to, the magnetic recording tape by inserting the tape cartridge, which contains the magnetic recording tape, into a tape drive. The tape drive passes the magnetic recording tape across a read/write head contained within the tape drive. A tape cartridge generally includes either one or two tape reels. A tape reel is used to wind the magnetic recording tape around the tape reel in layers for storage.

A tape cartridge containing two tape reels commonly retains the magnetic tape within the tape cartridge during normal operation. However, a tape cartridge containing a single tape reel requires that the magnetic tape be withdrawn from the tape cartridge for use. The single reel tape cartridge requires a threading mechanism to draw the magnetic recording tape from the tape cartridge in order to place the magnetic recording tape in proximity to the read/write head. The threading mechanism draws the magnetic recording tape from the tape cartridge reel, threads the magnetic recording tape along a tape path, and loads the magnetic recording tape onto a take up reel.

One type of threading mechanism presently used is a two-leader threading mechanism. A two-leader threading mechanism utilizes a cartridge reel tape leader and a drive reel leader. A tape leader is a length of unrecorded tape, or other similar material, used to thread magnetic recording tape into a tape drive. The cartridge reel tape leader is connected at the free end of the magnetic tape and the drive reel leader is connected to the tape drive take-up reel. The tape drive buckles the cartridge reel tape leader and the drive reel leader together by using a leader buckling mechanism. After the leader buckling mechanism buckles the cartridge reel tape leader to the drive reel leader, a tape drive motor is used to wind the drive reel leader onto the tape drive take-up reel. By winding the buckled drive reel leader onto the tape drive take-up reel, the cartridge reel tape leader is threaded through the tape drive's tape path pulling the magnetic tape from the tape cartridge.

Currently, the magnetic recording tape, which is attached to the cartridge reel tape leader, is much more fragile and is very thin in comparison to the cartridge reel tape leader. Pulling the cartridge reel tape leader and the magnetic recording tape through the tape path guide components and across the read/write head protect pins may create edge damage to the magnetic recording tape near the magnetic recording tape/cartridge reel tape leader interface. In addition, the height differential at the magnetic recording tape/cartridge reel tape leader interface may cause impressions extending into the tape pack, which may reduce magnetic recording tape performance. Further, separation of the magnetic recording tape and the cartridge reel tape leader may occur during loading and unloading operations due to the increased stress created by the height differential at the magnetic recording tape/cartridge reel tape leader interface.

Therefore, it would be advantageous to have an improved method and apparatus for handling magnetic recording tape during threading and unthreading of the magnetic recording tape in a tape drive system by utilizing an intermediate tape leader.

SUMMARY OF THE INVENTION

Embodiments of the present invention provide a method and an apparatus for utilizing a tape leader in a tape drive system. The tape drive system receives a first tape leader and buckles the first tape leader to a drive reel leader. Then the tape drive system threads the first tape leader and a second tape leader connected to the first tape leader through a tape path within the tape drive system using the drive reel leader. After threading the first tape leader through the tape path, the tape drive system retracts head protect pins while the second tape leader is still in the tape path. Subsequent to retracting the head protect pins, the tape drive system performs read/write operations on a data storage media, which is coupled to the first tape leader via the second tape leader inserted between the first tape leader and the data storage media.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
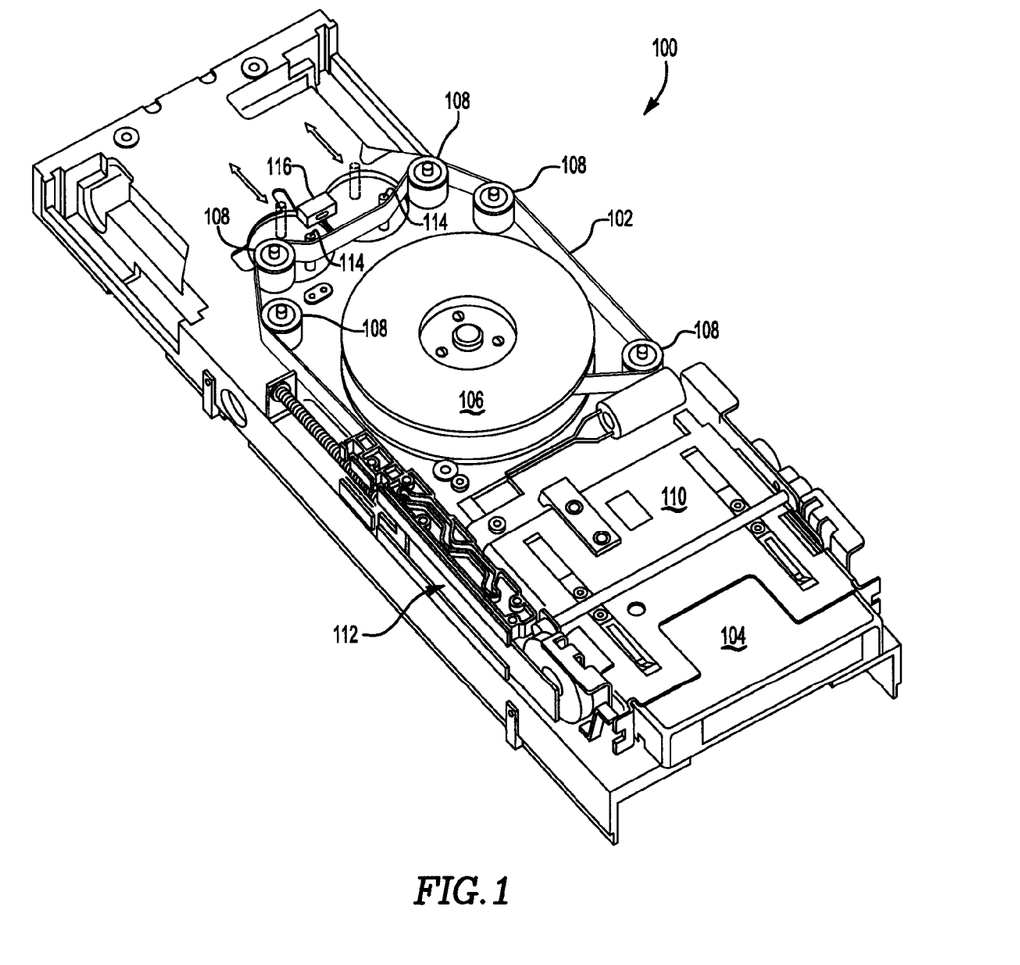
FIG. 1 is an exemplary pictorial illustration of a tape drive with a single reel tape cartridge loaded in accordance with an illustrative embodiment of the present invention.

With reference now to the figures, and in particular with reference to FIG. 1, an exemplary pictorial illustration of a tape drive with a single reel tape cartridge loaded in accordance with an illustrative embodiment of the present invention is shown. Tape drive 100 is an example of a tape drive system in which the present invention may be implemented. An example of a tape drive system that may be modified to be utilized by the mechanism and system of the present invention is a T10000 tape drive, which is available from Storage Technology Corporation of Louisville, Colo.

A user or an automated tape library system loads a tape cartridge, such as tape cartridge 104, into tape drive 100. Tape drive 100 contains tape drive shuttle 110, which houses tape cartridge 104 while tape cartridge 104 remains in tape drive 100. Tape drive shuttle 110 lowers tape cartridge 104 onto a tape drive motor. The tape drive motor, which is not shown in this illustrative example because the tape drive motor is unnecessary for a clear understanding of the process and system of the present invention, provides the power to move magnetic recording tape 102 from tape cartridge 104 to tape drive take-up reel 106.

Figure 2:
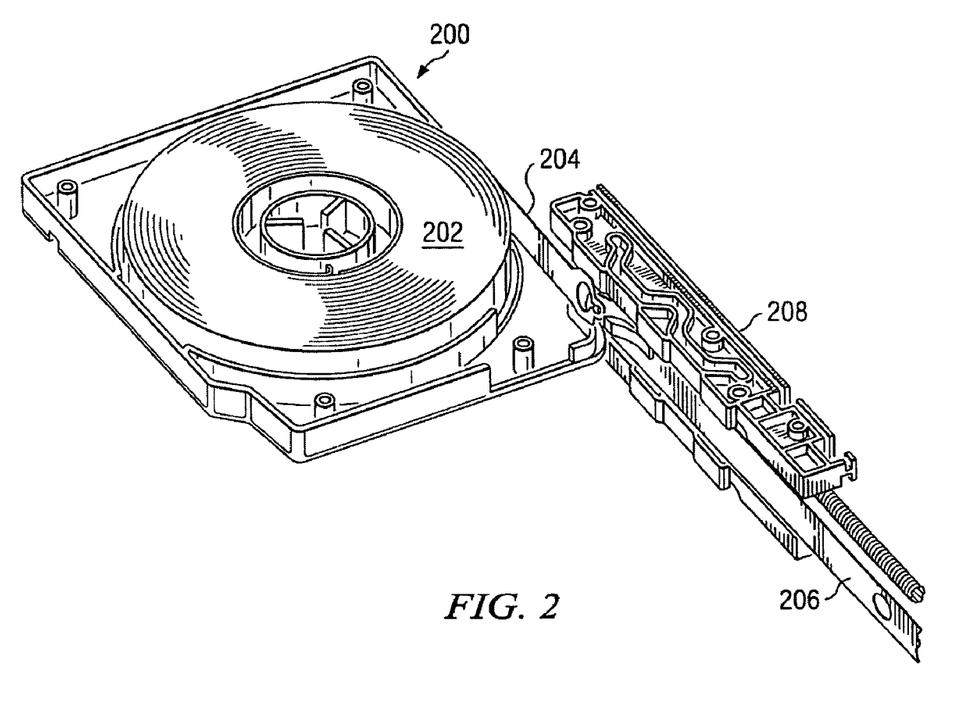
FIG. 2 is an exemplary pictorial illustration of a single reel magnetic tape cartridge with the top half of the cartridge removed in order to expose the tape reel containing the wound magnetic recording tape, intermediate leader, and standard tape leader in accordance with an illustrative embodiment of the present invention.
Figure 3:
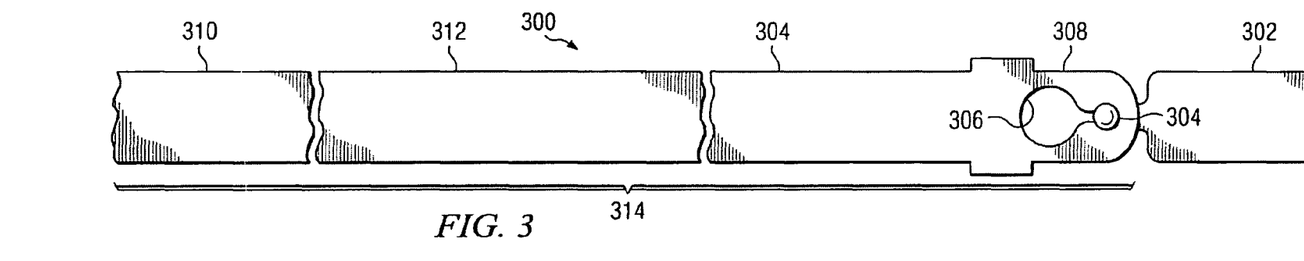
FIG. 3 is an exemplary illustration of a buckled tape drive leader to a standard tape leader, with an intermediate tape leader attached, in accordance with an illustrative-embodiment of the present invention.

Leader buckling mechanism 112 buckles a tape leader connected to the free end of magnetic recording tape 102 to a drive reel leader connected to tape drive take-up reel 106. In the context of this specification, buckling means coupling or joining together the tape leader connected to the free end of magnetic recording tape 102 to tape drive take-up reel 106 connected to a tape drive take-up reel. Leader buckling mechanism 112 may buckle magnetic recording tape 102 to tape drive take-up reel 106 by any means consistent with embodiments of the present invention. The tape leader is buckled to the drive reel leader in order to thread magnetic recording tape 102 along a tape path within tape drive 100 to tape drive take-up reel 106. FIG. 2 and FIG. 3 depict the buckling mechanism in more detail below.

The tape path may include tape guide components, such as, for example, tape guide posts 108 and head protect pins. Tape drive 100 uses tape guide posts 108 to accomplish the necessary directional changes for magnetic recording tap 102 within tape drive 100. Tape guide posts 108 route magnetic tape 102 from tape cartridge 104, to a tape head, and then to tape drive take-up reel 106. Tape head protect pins 114 are shown diagrammatically in a deployed position and a retracted position. The tape head 116 is shown diagrammatically. The tape head 116 performs read/write operations on magnetic recording tape 102 and the tape head protect pins 114 protect the tape head 116 from the drive reel leader and the standard tape leader during threading and unthreading operations. Also, tape drive 100 may contain one or more tape heads.

While FIG. 1 depicts a tape drive system, the depiction of a tape drive system is only intended to be illustrative. It should be appreciated by those skilled in the art that the present invention is not limited to the use of magnetic recording tape, but may be implemented in any tape system without departing from the spirit and scope of the present invention. Also, it should be noted that not all components of tape drive 100 are shown or described in this illustrative example. In this regard, tape drive 100 as shown and described is intended only as an illustrative example and not as an architectural limitation on the present invention. Further, tape drive 100 may be a stand-alone tape drive system or may be a component of an automated data storage library system.

Embodiments of the present invention provide a method and apparatus for utilizing a tape leader in a tape drive system. The tape drive system receives a first tape leader and buckles the first tape leader to a drive reel leader. Then the tape drive system threads the first tape leader and a second tape leader connected to the first tape leader through a tape path within the tape drive system using the drive reel leader. After threading the first tape leader through the tape path, the tape drive system retracts head protect pins while the second tape leader is still in the tape path. Subsequent to retracting the head protect pins, the tape drive system performs read/write operations on a data storage media, which is coupled to the first tape leader via the second tape leader inserted between the first tape leader and the data storage media.

The thickness of the second tape leader is greater than the thickness of the data storage media and less than the thickness of the first tape leader. The thickness of the second tape leader reduces magnetic recording tape edge damage at the magnetic recording tape/second tape leader interface during threading and unthreading of the magnetic recording tape and second tape leader through the tape path within the tape drive.

Embodiments of the present invention may provide a more robust interface between magnetic recording tape and a standard tape leader by inserting an intermediate tape leader between the magnetic recording tape and the standard tape leader. The more robust interface between the magnetic recording tape and the intermediate tape leader may reduce magnetic recording tape edge load at the tape/leader interface. The reduced magnetic recording tape edge load at the more robust interface may reduce magnetic recording tape edge damage, thereby increasing magnetic recording tape performance and decreasing costs. In addition, the more robust interface between the magnetic recording tape and the intermediate tape leader may reduce occurrences of separation between the magnetic recording tape and the standard tape leader during normal threading and unthreading operations in the tape drive.

Further, the intermediate tape leader reduces step height at the magnetic recording tape/intermediate tape leader interface and the intermediate tape leader/standard tape leader interface. Reducing the step height reduces tape pack impressions, thereby increasing magnetic recording tape performance by decreasing magnetic recording tape damage due to the tape pack impressions. Moreover, the intermediate tape leader allows for greater tape head protect pin angle tolerance. The greater tape head protect pin angle tolerance improves tape drive manufacturability.

Referring now to FIG. 2, an exemplary pictorial illustration of a single reel magnetic tape cartridge is depicted with the top half of the cartridge removed in order to expose the single tape reel containing the wound magnetic recording tape, intermediate leader, and standard tape leader in accordance with an illustrative embodiment of the present invention. Single reel tape cartridge 200 is an example of a single reel tape cartridge in which the present invention may be implemented.

Single reel tape cartridge 200 contains tape cartridge reel 202. Tape cartridge reel 202 stores magnetic recording tape, such as, for example, magnetic recording tape 102 in FIG. 1, in wound layers. In an embodiment of the present invention, the magnetic recording tape, which is wound around tape cartridge 202, has an intermediate tape leader attached at the free end of the magnetic recording tape. The intermediate tape leader and the magnetic recording tape are not visible in this illustrative example because the intermediate tape leader and the magnetic recording tape are wound on tape cartridge reel 202 underneath standard tape leader 204.

The intermediate tape leader is a segment of unrecorded tape, which connects the magnetic recording tape to standard tape leader 204. However, the intermediate tape leader is not restricted to tape material. It should be appreciated by those skilled in the art that the intermediate tape leader may be made of any material that is consistent with embodiments of the present invention.

Also, the intermediate tape leader has a thicker or greater dimension than the magnetic recording tape, but a thinner or lesser dimension than standard tape leader 204. Consequently, the intermediate tape leader gradually reduces the step height between the magnetic recording tape and the standard tape leader. The relative thicknesses of the magnetic recording tape and the intermediate and standard tape leaders are discussed in the description of FIG. 5 and FIG. 6 below.

In the illustrative example of FIG. 2, standard tape leader 204 is visible because single reel tape cartridge 200 is ready to be loaded into a tape drive, such as tape drive 100 in FIG. 1. In a ready position, the head of standard tape leader 204 is located at an opening in single reel tape cartridge 200 where standard tape leader 204, the intermediate tape leader, and the magnetic recording tape are withdrawn. After a user or an automated system loads single reel tape cartridge 200 into the tape drive, the head of standard tape leader 204 is buckled to drive reel leader 206 by leader buckling mechanism 208. Leader buckling mechanism 208 may be, for example, leader buckling mechanism 112 in FIG. 1.

Drive reel leader 206 is attached to a tape drive take-up reel, such as tape drive take-up reel 106 in FIG. 1. Drive reel leader 206 is used to thread standard tape leader 204, which in turn threads the intermediate tape leader and the magnetic recording tape, through the tape drive's tape path. The tape path includes tape guide posts, such as tape guide posts 108 in FIG. 1, which directs the magnetic recording tape to a tape head for read/write operations and then finally to the tape drive take-up reel.

Turning now to FIG. 3, an exemplary illustration of a buckled tape drive leader to a standard tape leader, with an intermediate tape leader attached, is shown in accordance with an illustrative embodiment of the present invention. Buckled drive reel leader and standard tape leader 300 includes drive reel leader 302, such as drive reel leader 206 in FIG. 2, and standard tape leader 304, such as standard tape leader 204 in FIG. 2. Drive reel leader 302 may have mushroom shaped button 304 on the free end of drive reel leader 302. The mushroom shaped button inserts into keyhole shaped aperture 306 located on head 308 of standard tape leader 304.

A leader buckling mechanism, such as, for example, leader buckling mechanism 112 in FIG. 1, performs the buckling process by automatically inserting mushroom shaped button 304 into keyhole shaped aperture 306 after a user or automated system loads a tape cartridge, such as tape cartridge 104 in FIG. 1, into a tape drive, such as tape drive 100 in FIG. 1. Of course, embodiments of the present invention are not restricted to the use of a mushroom shaped button and a keyhole shaped aperture to accomplish the buckling process. Embodiments of the present invention may employ any type of buckling or linking mechanism that is consistent with the process and system of embodiments of the present invention.

Standard tape leader 304 is connected to magnetic recording tape 310 by intermediate tape leader 312. Intermediate tape leader 312 is attached to standard tape leader 304 and magnetic recording tape 310 by means of splicing tape, which is not shown in the illustrative example of FIG. 3 because the splicing tape is unnecessary for a clear understanding of embodiments of the present invention. However, it should be noted that embodiments of the present invention are not restricted to the use of splicing tape to join intermediate tape leader 312 with standard tape leader 304 and magnetic recording tape 310. Embodiments of the present invention may utilize any means to join intermediate tape leader 312 with standard tape leader 304 and magnetic recording tape 310, such as, for example, using an adhesive solution or melting/welding the surfaces together. Alternatively, magnetic media tape 314 may be manufactured as one continuous piece.

Figures 4, 5:
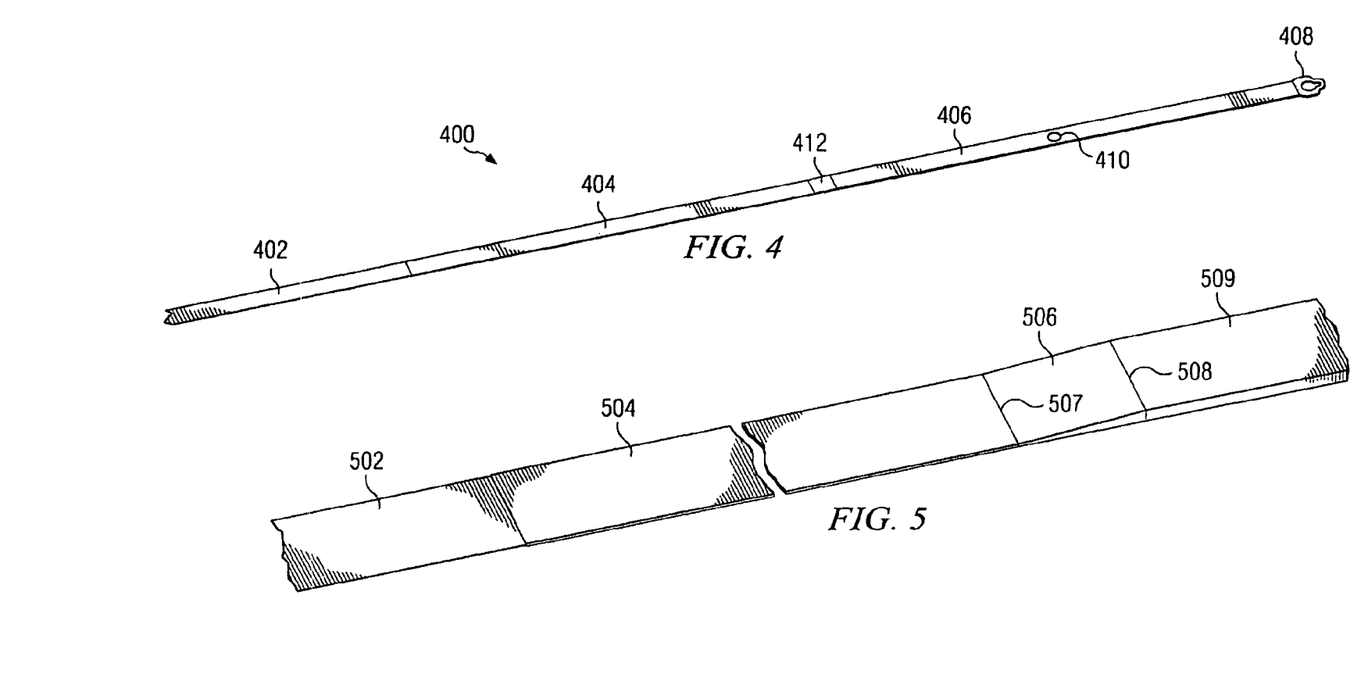
FIG. 4 is an exemplary illustration of magnetic recording tape with an intermediate and standard tape leader attached in accordance with an embodiment of the present invention.
FIG. 5 is an exemplary illustration of magnetic recording tape thickness, intermediate tape leader thickness, taper thickness, and standard tape leader thickness in accordance with an embodiment of the present invention.

With reference now to FIG. 4, an exemplary illustration of magnetic recording tape with an intermediate and standard tape leader attached is depicted in accordance with an embodiment of the present invention. Magnetic recording tape with leaders 400 may be, for example, magnetic media tape 314 in FIG. 3. Magnetic recording tape with leaders 400 may consist of magnetic recording tape 402, intermediate tape leader 404, and standard tape leader 406.

Standard tape leader 406 may include head 408, such as head 308 in FIG. 3, spacing aperture 410, and taper 412. Spacing aperture 410 permits a mushroom shaped buckling button, such as, for example, mushroom shaped button 304 in FIG. 3, to nest in a wound tape pack in order to reduce or eliminate tape pack impressions, which may cause data corruption in magnetic recording tape 402. Spacing aperture 410 is positioned on standard tape leader 406 to receive the mushroom shaped button during winding on a tape drive take-up reel, such as tape drive take-up reel 106 in FIG. 1. Standard leader 406 may contain one or more spacing apertures. The number of spacing apertures required to reduce or eliminate tape pack impressions depends on the length of standard tape leader 406 and the size of the mushroom shaped button. In addition, spacing apertures may be found in a drive reel leader, such as drive reel leader 206 in FIG. 2, as well.

Typically, standard tape leader 406 is approximately 18.5 inches long. However, embodiments of the present invention are not restricted to an 18.5 inch standard tape leader. Embodiments of the present invention may utilize a standard tape leader of any length that accomplishes the purposes of embodiments of the present invention.

Taper 412 is tapered and reduces the step height between standard tape leader 406 and intermediate tape leader 404. Taper in the context of this illustration means a gradual height reduction over a predetermined length of segment. Taper 412 is a relatively short segment of standard tape leader 406. Taper 412 may be any length to accomplish the purposes of embodiments of the present invention.

Intermediate tape leader 404 may be, for example, 27 inches long. However, embodiments of the present invention are not limited to a 27 inch intermediate tape leader. Embodiments of the present invention may utilize an intermediate tape leader of any length that accomplishes the purposes of embodiments of the present invention. Furthermore, embodiments of the present invention are not limited to the use of one intermediate tape leader. Embodiments of the present invention may utilize a plurality of intermediate tape leaders to accomplish the process and system of embodiments of the present invention.

With regard to magnetic recording tape 402, magnetic recording tape 402 may be any length within the limits of a tape cartridge reel, such as, for example, tape cartridge reel 202 in FIG. 2.

Referring now to FIG. 5, an exemplary illustration of magnetic recording tape thickness, intermediate tape leader thickness, taper thickness, and standard tape leader thickness is shown in accordance with an embodiment of the present invention. For example, magnetic recording tape 502, such as magnetic recording tape 402 in FIG. 4, may have a thickness of 0.00025 of an inch. Intermediate tape leader 504, such as intermediate tape leader 404 in FIG. 4, may have a thickness of 0.0007 of an inch. Taper 506, such as taper 412 in FIG. 4, may have a thickness from 0.00125 of an inch at intermediate tape leader/taper interface 507, to a thickness of 0.0082 of an inch at taper/standard tape leader interface 508. Lastly, standard tape leader 508, such as standard tape leader 406 in FIG. 4, may have a thickness of 0.0082 of an inch. However, the thickness values or measurements listed above are not meant as limitations on embodiments of the present invention. The thickness measurements of the magnetic recording tape, the intermediate tape leader, the taper, and the standard tape leader may be increased or decreased as required to implement embodiments of the present invention.

While FIG. 5 depicts relative thickness values of the magnetic recording tape, the intermediate tape leader, the taper, and the standard tape leader, the thickness values depicted are only intended to be illustrative. It should be appreciated by those skilled in the art that the present invention is not restricted to the thickness values mentioned, but may be implemented using any magnetic recording tape thickness, intermediate tape leader thickness, taper thickness, and standard tape leader thickness consistent with embodiments of the mechanism and system of the present invention. In addition, the intermediate tape leader thickness value may be any value that is less than or equal to the standard leader thickness value and greater than or equal to the magnetic recording tape thickness value.

Figure 6:
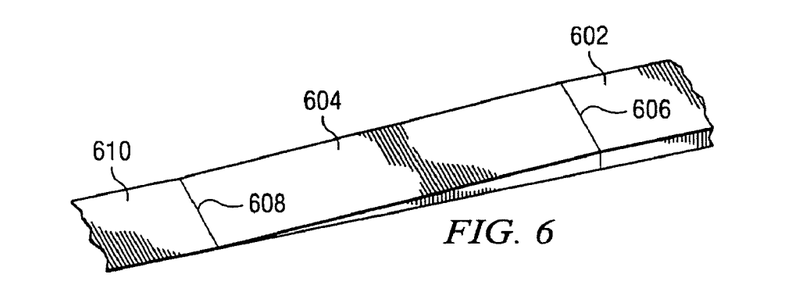
FIG. 6 is an exemplary illustration of an intermediate tape leader having a uniform taper from the standard tape leader to the magnetic recording tape in accordance with an embodiment of the present invention.

With reference now to FIG. 6, an exemplary illustration of an intermediate tape leader is shown having a uniform taper from the standard tape leader to the magnetic recording tape in accordance with an embodiment of the present invention. In the context of this illustration, a uniform taper is a consistent, gradual height reduction over a predetermined segment length. For example, intermediate tape leader 604, such as intermediate tape leader 504 in FIG. 5, may be consistently and gradually reduced in height from 0.0082 of an inch at standard tape leader/intermediate tape leader interface 606, to 0.00025 of an inch at intermediate tape leader/magnetic recording tape interface 608.

Alternatively, only a portion of intermediate tape leader 604 may be uniformly tapered. For example, only three-quarters, one-half, or one-quarter of the length of intermediate tape leader 604 is uniformly tapered and the remainder of intermediate leader 604 is the same thickness value. Or, intermediate tape leader 604 may have a varied taper. In other words, intermediate tape leader 604 is not uniformly tapered from standard tape leader/intermediate tape leader interface 606 to intermediate tape leader/magnetic recording tape interface 608 but varied over its length.

Standard tape leader 602, such as standard tape leader 509 in FIG. 5, may be have a thickness of 0.0082 of an inch and magnetic recording tape 610, such as magnetic recording tape 502 in FIG. 5, may be have a thickness of 0.00025 of an inch. Of course, as noted in the description of FIG. 5, the listed thicknesses above of standard tape leader 602, intermediate tape leader 604, and magnetic tape leader 610 are for illustrative purposes only and are not meant to be limitations on embodiments of the present invention. Any thickness consistent with embodiments of the present invention may be utilized by standard tape leader 602, intermediate tape leader 604, and magnetic tape leader 610 without departing from the scope and the spirit of the present invention.

Figure 7:
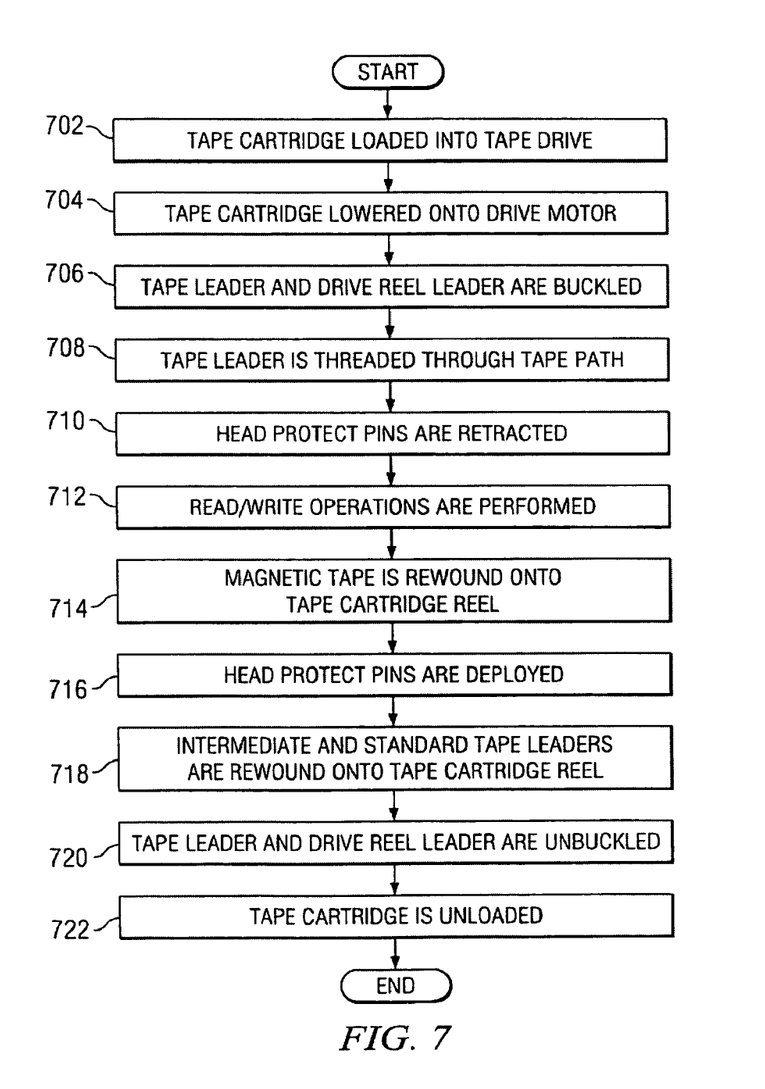
FIG. 7 is a flowchart outlining the exemplary loading and unloading process of a single reel tape cartridge containing magnetic recording tape, an intermediate tape leader, and a standard tape leader into a tape drive in accordance with an embodiment of the present invention.

Turning now to FIG. 7, a flowchart outlining the exemplary loading and unloading process of a single reel tape cartridge containing magnetic recording tape, an intermediate tape leader, and a standard tape leader into a tape drive in accordance with an embodiment of the present invention is depicted. The process illustrated in FIG. 7 may be implemented in a tape drive, such as tape drive 100 in FIG. 1.

The process begins when a tape cartridge, such as tape cartridge 104 in FIG. 1, is loaded into the tape drive (step 702). A user or an automated system inserts the tape cartridge into a tape drive shuttle, such as tape drive shuttle 110 in FIG. 1, which will house the tape cartridge while the tape cartridge is in the tape drive. Subsequent to loading the tape cartridge into the tape drive shuttle in step 702, the tape drive shuttle lowers the tape cartridge onto a tape drive motor (step 704). Then, a leader buckling mechanism, such as leader buckling mechanism 208 in FIG. 2, buckles a standard tape leader, such as standard tape leader 304 in FIG. 3, to a drive reel leader, such as drive reel leader 302 in FIG. 3 (step 706).

After the leader buckling mechanism buckles the standard tape leader to the drive reel leader in step 706, the drive reel leader threads the standard tape leader and an intermediate tape leader that is attached to the standard tape leader, such as intermediate tape leader 312 in FIG. 3, through the tape drive's tape path to a tape drive take-up reel, such as tape drive take-up reel 106 in FIG. 1 (step 708). While the intermediate leader is still in the tape path over the tape head, the tape drive retracts head protect pins in order to place the intermediate tape leader onto a tape head (step 710). The head protect pins may damage the magnetic recording tape, therefore it is important to have the intermediate tape leader in the tape path during head protect pin retraction and deployment. As the intermediate tape leader continues to be advanced through the tape path onto the tape drive take-up reel, magnetic recording tape, such as magnetic recording tape 310 in FIG. 3, which is attached to the intermediate tape leader, contacts the tape head. The tape head performs read/write operations on the magnetic recording tape (step 712).

Subsequent to the tape head performing read/write operations on the magnetic recording tape in step 712, the tape drive rewinds the magnetic recording tape onto a tape cartridge reel, such as tape cartridge reel 202 in FIG. 2 (step 714). After the tape drive rewinds the magnetic recording tape onto the tape cartridge reel in step 714 and while the intermediate tape leader is still in the tape path over the tape head, the tape drive deploys the head protect pins or places the head protect pins back into a tape head protect position (step 716). Subsequent to head protect pin deployment in step 716, the tape drive rewinds the intermediate tape leader and the standard tape leader onto the tape cartridge reel (step 718). The leader buckling mechanism unbuckles the standard tape drive leader from the drive reel leader (step 720), after the rewinding process of steps 714-718 is complete. Finally, a user or automated system unloads the tape cartridge from the tape drive (step 722) and the process terminates thereafter.

Thus, embodiments of the present invention provide a method and apparatus for utilizing a tape leader in a tape drive system. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for utilizing a tape leader in a tape drive system, the method comprising:
receiving a first tape leader into the tape drive system;
buckling the first tape leader to a drive reel leader;
threading the first tape leader and a second tape leader connected to the first tape leader through a tape path and across a tape head within the tape drive system using the drive reel leader;
retracting head protect pins while the second tape leader is still in the tape path and across the tape head; and
performing read/write operations on a data storage media, wherein the data storage media is coupled to the first tape leader via the second tape leader inserted between the first tape leader and the data storage media and a thickness of the second tape leader is less than a thickness of a first tape leader/second tape leader interface and greater than a thickness of a data storage media/second tape leader interface, wherein the second tape leader includes a uniform taper from a first tape leader interface thickness to a data storage media thickness.

2. The method of claim 1, wherein the thickness of the second tape leader reduces data storage media edge damage at the data storage media/second tape leader interface during threading and unthreading of the data storage media and second tape leader through the tape path within the tape drive system.

3. The method of claim 1, wherein the buckling step is performed by a leader buckling mechanism, and wherein the leader buckling mechanism is contained within the tape drive system.

4. The method of claim 1, wherein the first tape leader is a standard tape leader that is attached to the second tape leader, and wherein the standard tape leader includes a head with a keyhole aperture on a free end of the standard tape leader.

5. The method of claim 4, wherein the drive reel leader is attached to a tape drive take-up reel within the tape drive system, and wherein the drive reel leader includes a mushroom shaped button on a free end of the drive reel leader.

6. The method of claim 5, wherein the buckling step comprises inserting the drive reel leader mushroom shaped button into the standard tape leader keyhole aperture.

7. The method of claim 1, wherein the data storage media is a magnetic recording tape.

8. The method of claim 1, wherein the tape path comprises tape guide components, and wherein the tape guide components include tape guide posts and head protect pins.

9. A tape drive system, comprising:
a housing, wherein the housing receives a data storage device, and wherein the housing positions the data storage device within the tape drive system for tape drive operation, and wherein the data storage device includes a first tape leader, a second tape leader, and a data storage media;
a leader buckling mechanism;
a tape drive take-up reel; and
a drive reel leader, wherein the drive reel leader is attached to the tape drive take-up reel, and wherein the leader buckling mechanism buckles the first tape leader to the drive reel leader, threads the first tape leader and the second tape leader connected to the first tape leader through a tape path and across a tape head within the tape drive system using the drive reel leader, retracts head protect pins while the second tape leader is still in the tape path and across the tape head, and performs read/write operations on the data storage media that is coupled to the first tape leader via the second tape leader inserted between the first tape leader and the data storage media, and a thickness of the second tape leader is less than a thickness of a first tape leader/second tape leader interface and greater than a thickness of a data storage media/second tape leader interface, wherein the second tape leader includes a uniform taper from a first tape leader interface thickness to a data storage media thickness.

10. The tape drive system of claim 9, wherein the thickness of the second tape leader reduces data storage media edge damage at the data storage media/second tape leader interface during threading and unthreading of the data storage media and second tape leader through the tape path within the tape drive system.

11. The tape drive system of claim 9, wherein the first tape leader is a standard tape leader that is attached to the second tape leader, and wherein the standard tape leader includes a head with a keyhole aperture on a free end of the standard tape leader.

12. The tape drive system of claim 11, wherein the drive reel leader includes a mushroom shaped button on a free end of the drive reel leader.

13. The tape drive system of claim 12, wherein the leader buckling mechanism buckles the first tape leader to the drive reel leader by inserting the drive reel leader mushroom shaped button into the standard tape leader keyhole aperture.

14. The tape drive system of claim 9, wherein the data storage media is a magnetic recording tape.

15. The tape drive system of claim 9, wherein the tape path comprises tape guide components, and wherein the tape guide components include tape guide posts and head protect pins.

16. A tape drive system, comprising:
a housing, wherein the housing receives a data storage tape, and wherein the housing positions the data storage tape within the tape drive system for tape drive operation, and wherein the data storage tape includes a first tape leader, a second tape leader, and a data storage media;
a leader buckling mechanism;
a tape drive take-up reel; and
a drive reel leader attached to the tape drive take-up reel, and wherein the leader buckling mechanism buckles the first tape leader to the drive reel leader, threads the first tape leader and the second tape leader connected to the first tape leader through a tape path within the tape drive system using the drive reel leader, and performs read/write operations on the data storage media that is coupled to the first tape leader via the second tape leader inserted between the first tape leader and the data storage media, and the second tape leader includes a uniform taper from a first tape leader interface/second tape leader thickness to a data storage media thickness.

* * * * *

UNITED STATES PATENT AND TRADEMARK OFFICE
CERTIFICATE OF CORRECTION

| | | |
|---|---|---|
| PATENT NO. | : 7,861,961 B2 | Page 1 of 1 |
| APPLICATION NO. | : 11/317745 | |
| DATED | : January 4, 2011 | |
| INVENTOR(S) | : William J. Vanderheyden et al. | |

It is certified that error appears in the above-identified patent and that said Letters Patent is hereby corrected as shown below:

In column 1, line 43, delete "take up" and insert -- take-up --, therefor.

In column 2, line 53-54, delete "illustrative-embodiment" and insert -- illustrative embodiment --, therefor.

In column 3, line 46, delete "tap" and insert -- tape --, therefor.

Signed and Sealed this
Thirteenth Day of September, 2011

David J. Kappos
*Director of the United States Patent and Trademark Office*